United States Patent
Stahl et al.

(10) Patent No.: US 7,090,082 B2
(45) Date of Patent: Aug. 15, 2006

(54) METHOD AND DEVICE FOR SEPARATING MATERIALS

(75) Inventors: Werner H. Stahl, Landau (DE); Bernhard Hoffner, Karlruhe (DE)

(73) Assignee: Bokela Ingenieurgesellschaft fuer mechanische Verfahrenstechnik mbH, Karlsruhe (DE)

( * ) Notice: Subject to any disclaimer, the term of this patent is extended or adjusted under 35 U.S.C. 154(b) by 0 days.

(21) Appl. No.: 10/473,590

(22) PCT Filed: Mar. 28, 2002

(86) PCT No.: PCT/EP02/03551

§ 371 (c)(1),
(2), (4) Date: Oct. 9, 2003

(87) PCT Pub. No.: WO02/083259

PCT Pub. Date: Oct. 24, 2002

(65) Prior Publication Data

US 2004/0112798 A1    Jun. 17, 2004

(30) Foreign Application Priority Data

Apr. 12, 2001 (DE) ................................ 101 18 443

(51) Int. Cl.
*B03B 5/00* (2006.01)
(52) U.S. Cl. ...................... 209/156; 209/730
(58) Field of Classification Search ............... 209/716, 209/730, 156–158, 17, 250, 723; 210/772; 207/134–137
See application file for complete search history.

(56) References Cited

U.S. PATENT DOCUMENTS

| | | | | |
|---|---|---|---|---|
| 2,493,218 A | * | 1/1950 | Bergstrom | 208/152 |
| 2,631,726 A | * | 3/1953 | Auer | 209/157 |
| 3,251,468 A | * | 5/1966 | Muller | 210/772 |
| 4,174,281 A | | 11/1979 | Dell | |
| 4,290,998 A | | 9/1981 | Dick et al. | |
| 4,421,874 A | | 12/1983 | Seefluth | |
| 4,541,840 A | * | 9/1985 | Hibbel et al. | 48/63 |
| 4,568,453 A | * | 2/1986 | Lowe, Jr. | 209/135 |
| 4,670,226 A | * | 6/1987 | Furuyama et al. | 422/216 |
| 4,865,721 A | * | 9/1989 | Smith et al. | 209/135 |
| 6,405,405 B1 | * | 6/2002 | Hauch | 209/136 |
| 6,874,644 B1 | * | 4/2005 | Wagener et al. | 210/513 |
| 2004/0045882 A1 | * | 3/2004 | Chilibeck | 210/137 |

FOREIGN PATENT DOCUMENTS

| | | |
|---|---|---|
| DE | 100 38 932 | 2/2002 |
| WO | WO 00/56417 | 9/2000 |

* cited by examiner

*Primary Examiner*—Joseph C. Rodriguez
(74) *Attorney, Agent, or Firm*—Jacobson Holman PLLC

(57) ABSTRACT

A method for separating materials, in which a mixture of materials is guided through a channel in a direction of flow that extends at least approximately parallel to the gravitational field. Utilizing a wash fluid conveyed through the channel in a direction transverse to the direction of flow of the mixture of materials, at least one material component of the mixture of materials that is to be separated is displaced from the mixture of materials and removed from the channel. A device is also provided that is particularly suitable for carrying out the method.

27 Claims, 3 Drawing Sheets

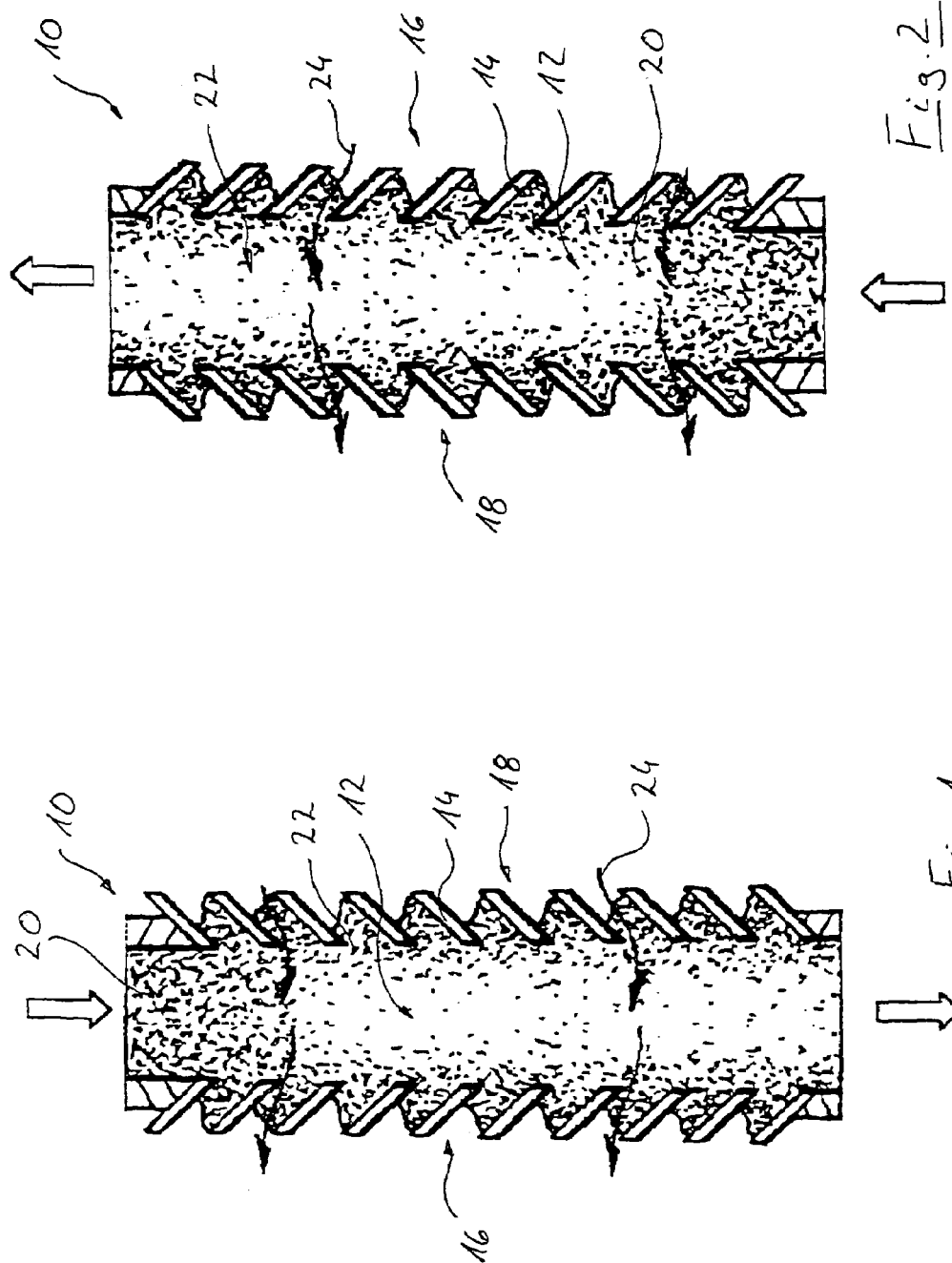

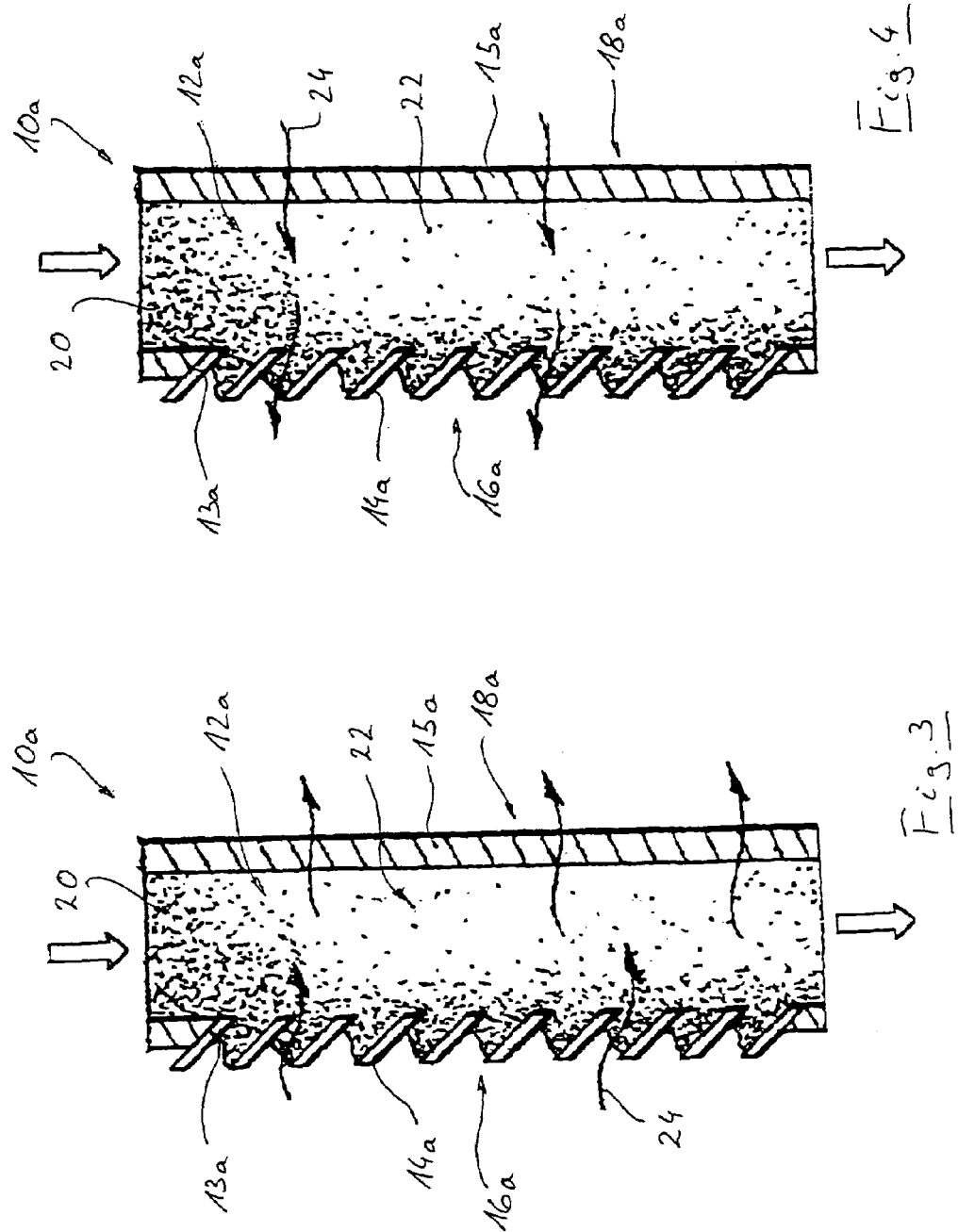

METHOD AND DEVICE FOR SEPARATING MATERIALS

BACKGROUND OF THE INVENTION

This is a nationalization of PCT/EP02/03551 filed Mar. 28, 2002 and published in German.

1. Field Of The Invention

The invention relates to a method for separating materials in which a mixture of materials is guided through a channel in a direction of flow extending at least approximately parallel to the gravitational field and a wash fluid is conveyed through the channel, which displaces from the mixture of materials and removes from the channel at least one material component of the mixture of materials that is to be separated. The invention further relates to a device for separating materials for carrying out the aforesaid method.

2. Related Art

A method and a device of the aforementioned type are known from DE 100 38 932. In this known method the mixture of materials to be separated is introduced into a vertically arranged channel and flows through this channel whilst being influenced by the gravitational field. In the channel a plurality of guide members is arranged successively, which direct a flow of wash fluid that flows into the channel in the opposite direction to the direction of flow of the mixture of materials. As a result of this a displacement area is formed in the area of each guide member, in which the wash fluid flows through the mass flow of the mixture of materials whilst displacing thereby the material component of the mixture of materials to be separated and removing the latter from the channel at the end of the channel, at which the mixture of materials was introduced into the channel. On account of the multitude of employed guide members which must be precisely aligned to each other and positioned in the channel in order to generate the desired flow effect of the wash fluid in the channel the device used to carry out the method has a correspondingly complicated design.

SUMMARY OF THE INVENTION

The invention is based on the object to develop a method and respectively a device for separating materials, with which or through the use of which an efficient separation of different material components from the mixture of materials is rendered possible in a particularly simple way.

The object is solved in accordance with the invention by a method for separating materials, in which a mixture of materials is guided through a channel in a direction of flow extending at least approximately parallel to the gravitational field and a wash fluid is conveyed through the channel, which displaces from the mixture of materials and removes from the channel at least one material component of the mixture of materials that is to be separated, characterized in that the wash fluid is conveyed through the channel in a direction transverse to the direction of flow of the mixture of materials. The object is further solved by a device in accordance with the invention having at least a channel for guiding through a mixture of materials to be separated, which includes at least one inlet portion and at least one outlet portion for a wash fluid in order to displace from the channel, a material component to be separated from the mixture of materials, characterized in that the inlet portion and the outlet portion are provided at the channel wall and seen transversely to the longitudinal direction of the channel, the inlet portion and the outlet portion lie opposite each other in a direct or offset manner at least in sections.

Advantageous further developments of the invention become apparent from the description and the drawing.

In the method according to the invention the mixture of materials, in particular a mixture of materials consisting of solid and fluid components, is guided through the channel for sedimentation in a direction that is at least approximately parallel to the gravitational field.

The material components of the mixture of materials, which differ from each other in their physical properties, in particular their density and lift, are distributed in an approximately even fashion in the fluid flow of the mixture of materials when seen in the cross-section of the flow. In order to improve the separation of materials in this sedimentation process the wash fluid is conveyed through the channel in a direction transverse to the direction of flow of the mixture of materials, i.e. it is guided into the channel at such an angle that the wash fluid flows through the channel and at least partially leaves the channel again in the lateral direction with respect to the fluid flow. By introducing the wash fluid transversely into the fluid flow it is achieved that the material components that are distributed evenly in the mixture of materials due to the vertical direction of flow are separated from each other on account of their physical properties, with the material component to be separated being displaced by the wash fluid and removed from the channel while the other material components are also flowed against by the transversely flowing wash fluid but not removed from the channel. As a result of the method according to the invention to distribute single material components evenly in the fluid flow due to the vertical flow direction and to separate these by means of the wash fluid directed into the fluid flow in a transverse direction a separation of materials is implemented in an elegant and especially effective way. The method in accordance with the invention is particularly suitable for washing, adsorption or desorption, ion exchange, heat exchange, depth filtration or also for the extraction of such mixtures of materials. The method can be carried out in a continuous or quasi-continuous fashion.

In a preferred method variant according to the invention it is proposed to guide the wash fluid into and/or out of the channel by guide members that limit the channel at least partially. With the guide members it is possible for the wash fluid to be introduced in a defined manner into the fluid flow of the mixture of materials so as to achieve that the mixture of materials is flowed against and transversely flowed through by the wash fluid as desired.

When using the above-described guide members it is furthermore advantageous if, as seen in the direction of flow of the mixture of materials, the guide members can be inclined with their flat sides such that particulate material components of the mixture of materials, such as e.g. crystals, long-chained molecules and the like, that may deposit on the guide members at least partially slide back into the passing mixture of materials on account of the angle of inclination of the guide members. Through the inclined position of the guide members it is achieved in particular that particulate material components which may deposit on the guide members do not accumulate to such an extent that these particulate material components unintentionally pass over from the channel and are removed from the latter by the wash fluid.

Instead of the guide members or also as a supplement to the guide members it is proposed in another method variant to convey the wash fluid into and/or out of the channel through at least one fluid-permeable surface section that limits the channel at least partially. Especially suited as fluid-permeable surface section is a filter medium, for instance a membrane, a filter cloth or the like that has the effect of a filter and is only fluid-permeable to the wash fluid and the material component to be separated by the wash fluid from the mixture of materials.

In order to keep the amount of technical equipment required for the material separation to a minimum it is suggested in a preferred embodiment of the method to convey the mixture of materials through the channel by means of the effect of gravitation only.

Alternatively, it is also possible to convey the mixture of materials through the channel by means of a conveying device, such as a pump, whereby a higher rate of flow of the mixture of the materials can be adjusted in the channel and an increased throughput is rendered possible in the separation of materials. Furthermore, depending on the mixture of materials to be separated it is possible to also convey the mixture of materials through the channel in the opposite direction to the gravitational force so that the effect of the gravitational forces is opposed to the direction of flow of the mixture of materials, as a consequence of which the separation of materials is improved further.

In addition, it is proposed in a preferred method variant to generate in the mixture of materials an oscillating and/or intermittent movement that overlaps the continuous flow of the mixture of materials, whereby a relative movement is generated especially between particulate material components of the mixture of materials, portions in-between particles are altered or broken open and made accessible to being flowed through by the wash fluid. In addition, as a result of the overlapping movement the formation of preferred flow paths in the fluid flow is counteracted or prevented to a large extent. If the fluid flow of the mixture of materials through the channel is circular or oval in flow cross-section it is furthermore proposed to generate in the mixture of materials a rotatory movement that overlaps the continuous flow, whereby the effects described before are additionally intensified in their efficacy.

Since the transverse flow of the wash fluid into the channel exerts a corresponding pressure onto the mixture of materials flowing in the longitudinal direction of the channel, as a consequence of which the flow behaviour of the mixture of materials in the channel is influenced and may be affected, it is furthermore advantageous to adjust the rate of flow of the wash fluid to the rate of flow of the mixture of materials. For this purpose it is proposed to adjust the rate of flow of the wash fluid with respect to the rate of flow of the mixture of materials such that the fluid flow of the mixture of materials through the channel is still maintained. In this it is particularly advantageous if the rate of flow of the wash fluid is adjusted such that a removal of material components from the channel that are to remain in the mixture of materials is prevented at least in an approximately complete manner.

In this method variant it is suggested further to additionally reduce the rate of flow as a function of the length of the channel which the mixture of materials has already flowed through, as the transversely in-flowing wash fluid brings about a decrease in the rate of flow of the mixture of materials. By selectively reducing the rate of flow of the wash fluid into the channel it is achieved that the mixture of materials flowing through the channel is only decelerated in its rate of flow to such a degree that any differences in the rate of flow that occur between single channel sections and have an adverse effect on the flow behaviour of the mixture of materials through the channel are avoided.

In a particularly preferred method variant according to the invention the rate of flow of the wash fluid is adjusted by setting a corresponding aspect ratio between the surface flowed through by the wash fluid when entering the channel and the surface flowed through by the wash fluid when leaving the channel. Here the aspect ratio at least approximately corresponds to the drop in pressure experienced by the wash fluid when flowing through the channel, whereby the rate of flow of the wash fluid which equally depends on the aspect ratio can be influenced at the same time.

To attain a particularly high efficiency of the separation of materials it is furthermore advantageous to convey the wash fluid through the channel repeatedly, and with each renewed flowing through the channel the transverse direction of flow of the wash fluid may differ from the transverse direction of flow of at least one previously generated transverse flow of the wash fluid through the channel. Since the mixture of materials is flowed through by the wash fluid repeatedly at different locations and preferably at a differing transverse direction of flow, differences in concentration of the material components appearing within the fluid flow are being compensated which results in an improved removal of the material component to be separated at a constant demand of wash fluid or in a constant removal of the material component to be separated at a reduced demand of wash fluid.

A further aspect of the invention is shown by the device for separating materials, in particular for carrying out the aforesaid method, comprising at least a channel for guiding through a mixture of materials to be separated, which includes at least one inlet portion and at least one outlet portion for a wash fluid in order to displace from the channel a material component to be separated from the mixture of materials, characterized in that the inlet portion and the outlet portion are provided at the channel wall and seen transversely to the longitudinal direction of the channel, the inlet portion and the outlet portion lie opposite each other in a direct or offset manner at least in sections. With this device in accordance with the invention the method set out above can be carried out and the advantages resulting therefrom can be achieved.

The device according to the invention is particularly characterized in that the inlet portion and the outlet portion for the wash fluid are provided at the channel wall, with the inlet portion and the outlet portion lying opposite each other in a direct or offset manner at least in sections when seen transversely to the longitudinal direction of the channel. On account of the arrangement of the inlet portion and the outlet portion according to the invention it is achieved that the wash fluid can be guided through the channel in a direction transverse to the direction of flow of the mixture of materials and in this the rate of flow of the wash fluid can be adjusted for example by a selective adjustment of the pressure difference between the portion and the outlet portion.

In a preferred embodiment of the device the inlet portion and/or the outlet portion include a plurality of guide members, with which the flow of the wash fluid can be selectively directed into and/or out of the channel.

In the direction of flow of the mixture of materials the guide members extend with their flat sides in an inclined fashion preferably at a predetermined angle to the longitudinal direction of the channel. Through this it is achieved that the wash fluid flows into the channel at the predetermined angle and yet in the direction of flow of the mixture of materials so that undesired turbulences of the fluid flow of the mixture of materials are avoided.

If the device according to the invention is also employed for separating material mixtures that include particulate material components, it is furthermore advantageous if the predetermined angle, at which the guide members extend in an inclined fashion to the longitudinal direction of the channel, corresponds to an angle of repose of the concerned particulate material component of the mixture of materials, at which a deposition of the particulate material component on the guide members is prevented at least in an approximately complete manner. In this manner it is avoided that the particulate material components deposit on the guide members and are perhaps removed from the channel by the wash fluid.

In order to be able to additionally change the rate of flow of the wash fluid and the direction of flow of the wash fluid it is also advantageous if the distance of the guide members that are preferably arranged parallel to each other and/or the predetermined angle at which the guide members extend in an inclined fashion to the longitudinal direction of the channel can be adjusted variably.

To the end that the fluid flow of the mixture of materials has an oval or circular flow cross-section in the channel it is proposed in a preferred embodiment to design the channel at least in the inlet portion and/or the outlet portion in an oval or circular cross-sectional form. In this embodiment the guide members are designed in a ring-shaped or ring-segment shaped fashion and arranged concentrically to the channel at least in sections.

Alternatively, it is suggested to provide the channel in the inlet portion and/or the outlet portion with a polygonal cross-sectional form, with the guide members being strip-shaped in this form of the channel.

To further influence the flow behaviour of the wash fluid in the channel it is proposed in addition to design the guide members in a curved manner in the longitudinal direction of the channel, whereby the development of turbulences in the wash fluid is prevented.

Instead of the above-described guide members or also as a supplement to the guide members it is proposed to provide a fluid-permeable surface section at the inlet portion and/or the outlet portion, which can be flowed through by the wash fluid and, if required, also by the material component to be separated. This way it is possible, especially when the mixture of materials contains particulate material components, to selectively prevent a removal of the particulate material components from the fluid flow.

In order to influence the rate of flow of the wash fluid it is suggested to provide the surface of the inlet portion flowed through by the wash fluid with a smaller dimension than the surface of the outlet portion flowed through by the wash fluid, through which a reduction of the rate of flow of the wash fluid is obtained when crossing the channel and consequently the occurrence of undesired turbulences in the fluid flow of the mixture of materials is prevented.

If the wash fluid is intended to be used repeatedly for separating materials it is furthermore advantageous if a plurality of inlet portions and outlet portions is designed at the channel, with each inlet portion having an outlet portion assigned thereto and, seen in the longitudinal direction of the channel, an inlet portion with the assigned outlet portion each follows an inlet portion with the assigned outlet portion and the respective following inlet portion is provided at the channel wall lying opposite the previous inlet portion. Through this it is achieved that the wash fluid flows through the channel, and consequently through the fluid flow of the mixture of materials, in a cross-shaped manner at different channel sections, i.e. at transverse directions of flow that are opposed to each other, which results in an even further improved removal of the material component to be separated from the mixture of materials.

For a repeated flow-through with the same wash fluid it is furthermore proposed to connect an outlet portion formed downstream with an inlet portion formed opposite the former upstream so that an additional counterflow separation of material is realized.

In the following a further description is given of the invention by means of preferred embodiments with reference to the drawing, wherein:

FIG. 1 shows a schematic sectional view of a first embodiment of a device for separating materials during operation according to a first method variant;

FIG. 2 shows a schematic sectional view of the device according to FIG. 1 during operation according to a second method variant;

FIG. 3 shows a schematic sectional view of a second embodiment of a device for separating materials during operation according to a third method variant;

FIG. 4 shows a schematic sectional view of the device according to FIG. 3 during operation according to a fourth method variant and FIG. 5 shows a schematic sectional view of a third embodiment of a device for separating materials during operation according to a fifth method variant;

BRIEF DESCRIPTION OF THE DRAWINGS

DETAILED DESCRIPTION OF THE PREFERRED EMBODIMENTS

Figure 5:
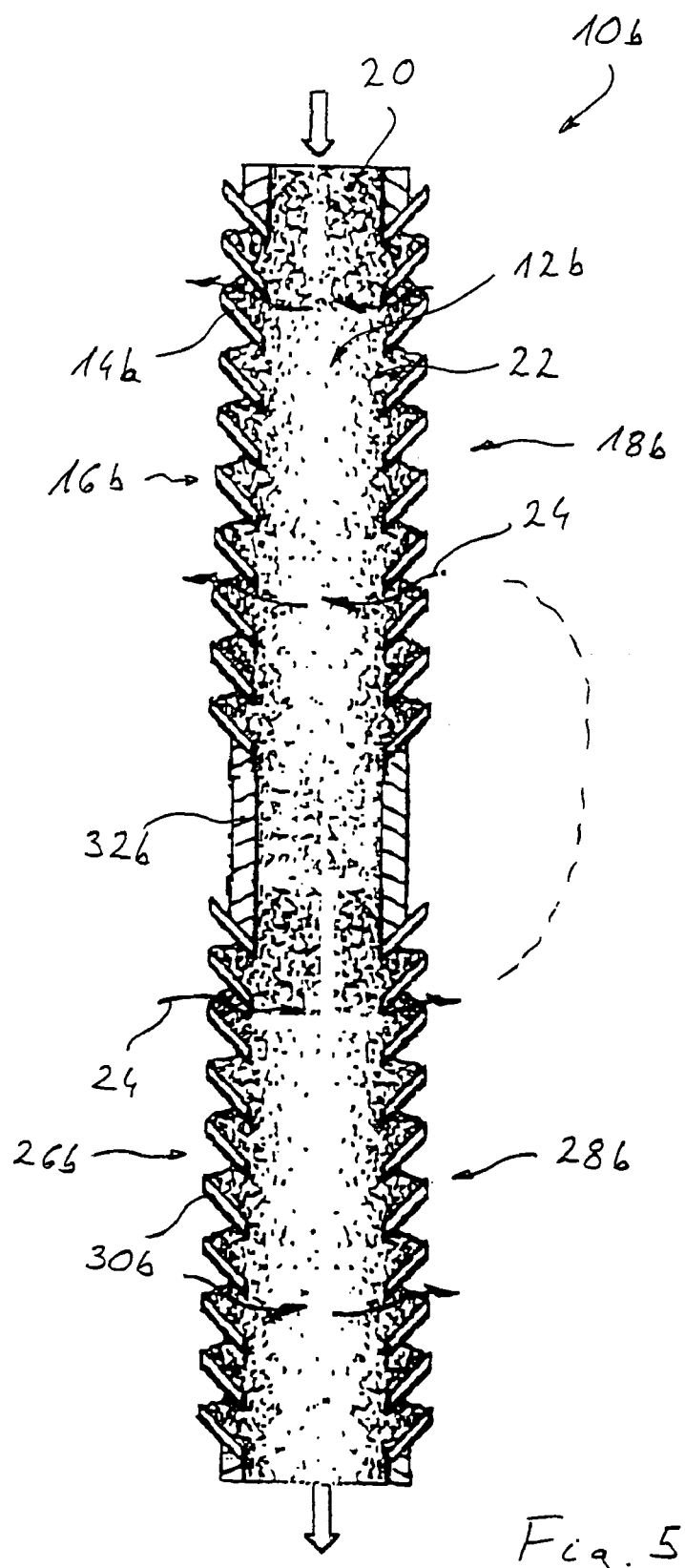

FIG. 1 is a strongly schematized representation of a sectional view of a device 10 for separating materials. The device 10 has a channel 12 that extends in its longitudinal direction at least approximately parallel to the gravitational field of the earth. In the embodiment depicted here the channel 12 has a circular cross-section. One section of the channel 12 is constituted by a plurality of circular guide members 14 which are arranged successively at equidistance in the longitudinal direction of the channel 12. The guide members 14 are divided by separating metal sheets not shown here into a first portion 16 illustrated on the left hand-side in FIG. 1 and a second portion 18 illustrated on the right hand-side in FIG. 1.

The openings of the two portions 16 and 18 which are defined by the guide members 14 are each connected to a fluid channel for a wash fluid that is not depicted, and here the two fluid channels can be constituted for example by a tube (not shown) arranged concentrically around the device 10 which is divided into two separate flow portions just as the portions 16 and 18.

If the device 10 is operated according to a first method variant, a mixture of materials 20 having a sediment-like character and containing at least one fluid material component besides at least one particulate material component 22 is guided into the channel 12, with the rate of flow of the mixture of materials 20 through the channel 12 being exclusively brought about by the gravitational force as indicated by the arrows at the inlet and outlet side of the channel 12. By the term fluid flow a sediment flow of the mixture of materials 20 is also understood in this context As can be seen in FIG. 1, the guide members 14 are arranged at an angle in an inclined fashion in the direction of flow of the mixture of materials 20, and in this connection the effect of the inclined arrangement will be explained hereinafter.

When the mixture of materials 20 flows through the channel 12 a wash fluid 24 is introduced into the second portion 18 serving as inlet portion in this method variant, which flows through the channel 12 in a direction transverse to the direction of flow of the mixture of materials 20 and leaves the channel 12 at the first portion 16 serving as outlet portion, as indicated by the arrows. As wash fluid 24 a fluid is used whose density differs from the density of the particulate material component 22. In this manner at least one further material component of the mixture of materials 20, which is to be separated from the mixture of materials 20, can be displaced in the channel 12 by the wash fluid 24 and removed from the channel 12 through the first portion 16.

On account of the transverse flow of the wash fluid 24 particulate material components 22, which deposit on the inclined guide members 14, are also pulled along to some extent. However, the guide members 14 are arranged in an inclined fashion with respect to the longitudinal direction of the channel such that their angle of inclination at least approximately corresponds to the angle of repose of the particular material component 22, i.e. an angle at which, once a specific quantity of deposited particles has been reached, the particles of the particulate material component 22 on the guide member 14 start to slide and are pulled along again by the passing fluid flow of the mixture of materials 20. As a result of the inclined position of the guide members 14 it is largely prevented on the one hand that particulate material components 22 are by mistake pulled along by the wash fluid 24 and removed from the channel 12 and on the other hand a space is provided wherein material particles that were pulled along can sediment and be redirected.

In the above-described method variant the rate of flow of the mixture of materials 20 is exclusively based on the gravitational force. In a modified method variant it is proposed further to additionally overlap the flow of the mixture of materials 20 by an oscillating, intermittent or pulsating and/or rotatory movement. Due to this additional speed component especially the particles of the particulate material component 22 experience at least temporarily a relative movement towards each other, whereby portions in-between particles are altered or broken open and made accessible to being flowed through by the wash fluid 24. In addition, the formation of preferred flow paths of the mixture of materials 20 in the fluid flow is prevented completely or at least to a large extent.

In FIG. 2 the device 10 described before is shown when being used in accordance with a second method variant according to the invention. To this end the device 10 is pivoted by 180° about the horizontal line so that the circular guide members 14 point upwards with their inner bore whereas the outer edge of each guide member 14 points downwards. In this method variant the mixture of materials 20 is conveyed through the channel 12 from below in the opposite direction to the gravitational force, and here the vertical movement can likewise be overlapped by an additional oscillating, intermittent or rotatory movement. In addition, in this embodiment the wash fluid 24 is conveyed into the channel 12 through the first portion 16 serving as inlet portion of the device 10 and leaves the channel 12 through the second portion 18 serving as outlet portion. In this case too the material component to be separated is displaced from the mixture of materials 20 by the wash fluid 24 and removed from the channel 12 through the second portion 18. This arrangement proves to be advantageous if the solid matter is lighter than the fluid, as it is the case with ice crystals in water for instance. The solid matter then deposits upwards.

In FIG. 3 a strongly schematic representation is given of a second embodiment of a device 10a for separating materials. In this second embodiment the device 10a has a channel 12a with an approximately rectangular flow cross-section. At the side wall of the channel 12a shown on the left hand-side in FIG. 3 a rectangular opening 13a is formed into which the strip-shaped guide members 14a are inserted. Through an adjusting device not depicted here the guide members 14a can be adjusted in their angle of inclination with respect to the longitudinal direction of the channel 12a. In addition, the distance of the guide members 14a extending parallel to each other can be changed by means of the same adjusting device. Moreover, several of the guide members 14a can be adjusted independently of the other guide members 14a so that the cross-section of the opening 13a can be changed.

The channel wall arranged opposite the guide members 14a is provided with a fluid-permeable filter medium 15a, for example a membrane, a filter cloth or the like. The opening 13a constitutes the first portion 16a of the channel 12a which is connected to a fluid line for the wash fluid 24 not depicted here. The second portion 18a constituted by the filter medium 15a is likewise connected to a fluid line for the wash fluid 24.

When operating the device 10a according to a third method variant the mixture of materials 20 is guided through the channel 12a in the vertical direction, and here the flow of the mixture of materials 20 through the channel 12a is exclusively brought about by the gravitational force. As soon as the mixture of materials 20 flows through the channel 12a, wash fluid 24 is guided through the first portion 16a serving as inlet portion, i.e. through the opening 13a into the channel 12a, while the guide members 14a predetermine the direction of flow of the wash fluid 24. The wash fluid 24 flows through the channel 12a in a direction transverse to the direction of flow of the mixture of materials 20 and leaves through the filter medium 15a that constitutes the outlet portion, as indicated by the arrows. To this end the filter medium 15a is designed in such a manner that it is exclusively permeable to the wash fluid 24 and the at least one material component to be separated from the mixture of materials 20. As soon as the wash fluid 24 enters the channel 12a it displaces the material component to be separated from the mixture of materials 20 and removes it from the channel 12a through the filter medium 15a.

Due to the fact that the filter medium 15a is only permeable to the wash fluid 24 and the material component to be separated especially the particular material components 22 remain in the channel 12a, whereby a particularly high efficiency is achieved during the separation of materials.

If the direction of flow of the wash fluid 24 is to be changed in the channel 12a or the rate of flow of the wash fluid 24 is to be reduced or increased, the guide members 14a can be adjusted by means of the adjusting device both in their angle of inclination and in their distance to each other so that the device 10a can be adjusted flexibly to different mixtures of materials 20 with different physical properties.

In FIG. 4 the device 10a is shown when being used according to a fourth method variant. This fourth method variant only differs from the method variant described with reference to FIG. 3 in that the wash fluid 24 flows into the channel 12a through the filter medium 15a serving as inlet portion in this case and that it flows out through the opening 13a serving as outlet portion.

In FIG. 5 a third embodiment of a device 10b for separating materials is illustrated. This device 10b basically corresponds to the device 10 described with reference to FIGS. 1 and 2, but in the case of device 10b there are two devices 10 arranged in succession that form a joint channel 12b. The device 10b therefore has a first and a second portion 16b and 18b with the guide members 14b as well as a third and a fourth portion 26b and 28b with the guide members 30b, with a pipe section 32b being arranged between the guide members 14b and 30b.

In this method variant the mixture of materials 20 is likewise conveyed through the channel 12b as a result of the effect brought about by the gravitational force. At the same time wash fluid 24 is introduced into the channel 12b in the third portion 26b shown on the left hand-side at the bottom of FIG. 5, which wash fluid leaves the channel 12b again through the fourth portion 28b while the material component to be separated from the mixture of materials 20 is removed from the channel 12b. However, the wash fluid 24 that leaves the fourth portion 28b is not drained off but conveyed to the second portion 18b shown on the right hand-side at the top of FIG. 5, through which it flows into the channel 12b whilst leaving the channel 12b afterwards through the first portion 16b. As a result of this method variant the wash fluid 24 is guided repeatedly through the fluid flow of the mixture of materials 20 and in doing so a counterflow of the wash fluid 24 is realized, i.e. a flow that is opposed to the direction of flow of the mixture of materials 20. In this manner several effects are achieved. On the one hand it is achieved by the different transverse directions of flow of the wash fluid 24 through the channel 12b that differences in concentration that may arise in the mixture of materials 20 on account of the displacement of the material component to be separated are compensated. On the other hand, influences on the flow behaviour of the fluid flow of the mixture of materials 20, which may develop on account of the transverse flow of the wash fluid are compensated at least in part.

The above-described devices and the above-described method variants are employed in particular for washing, adsorption or desorption, ion exchange, heat exchange, depth filtration or also for extraction. Furthermore, especially mixtures of materials having a sediment-like character are processed with the devices and methods according to the invention, which predominantly contain particulate material components and yet have the flowable properties corresponding to those of fluids.

The invention claimed is:

1. A method for separating materials, comprising the steps of:
   guiding a mixture of materials through a channel in a direction of flow extending at least approximately parallel to the gravitational field, the mixture consisting of solids and fluid components, which differ from each other in their physical properties, including their density and lift, and which are distributed in an approximately even fashion in a fluid flow of the mixture,
   conveying a wash liquid through the channel in a direction transverse to the direction of flow of the mixture of materials by means of an inlet portion and an outlet portion which are provided in a wall of the channel and which when seen transversely to the longitudinal direction of the channel lie opposite each other in a direct or offset manner at least in section, wherein the wash liquid displaces from the mixture of materials and removes from the channel at least one material component of the mixture of materials that is to be separated, and
   guiding the wash liquid into and/or out of the channel in a direction transverse to the flow direction of the mixture of materials by means of guide members which limit the channel at least partially and are arranged at least approximately parallel at a distance to each other and extend at a predetermined angle in an inclined fashion with respect to the direction of flow of the mixture of materials.

2. The method according to claim 1,
wherein
seen in the direction of flow of the mixture of materials the guide members are inclined with their flat sides in such a manner that particulate material components of the mixture of materials, which may deposit on the guide members, at least partially slide back into the mixture of materials passing by.

3. The method according to claim 1,
wherein
the wash liquid is conveyed into and/or out of the channel through at least one fluid-permeable surface section that limits the channel at least partially.

4. The method according to claim 3, wherein the wash liquid is conveyed into and/or out of the channel through a filter medium.

5. The method according to claim 3,
wherein
the at least one fluid-permeable surface section is a filter medium.

6. The method according to claim 1, further comprising the step of generating in the mixture of materials an oscillating, intermittent and/or rotatory movement that overlaps a continuous flow of the mixture of materials.

7. The method according to claim 1, further comprising the step of adjusting the rate of flow of the wash liquid with respect to the rate of flow of the mixture of materials such that the fluid flow of the mixture of materials through the channel is still maintained and a removal of the material component or components from the channel, which is or are to remain in the mixture of materials, is prevented at least in an approximately complete manner.

8. The method according to claim 7, further comprising the step of reducing the rate of flow of the wash liquid as a function of the length of the channel which the mixture of materials has already flowed through.

9. The method according to claim 1, further comprising the step of adjusting the rate of flow of the wash liquid through the channel according to the aspect ratio between the surface flowed through by the wash liquid when entering the channel and the surface flowed through by the wash liquid when leaving the channel.

10. The method according to claim 1,
wherein
the wash liquid is conveyed through the channel repeatedly and
with each renewed flowing through the channel the transverse direction of flow of the wash liquid differs from the transverse direction of flow of at least one previously generated transverse flow of the wash liquid through the channel.

11. The method according to claim 10,
wherein
with each renewed flowing through the channel the transverse direction of flow of the wash liquid differs at least from the transverse direction of flow of the transverse flow generated immediately beforehand.

12. The method according to claim 1, further comprising the step of generating in the channel a fluid flow of the mixture of materials, which is polygonal, circular or oval in flow cross-section.

13. The method according to claim 1,
wherein
the wash liquid is not a component of the mixture of materials to be separated and
the wash liquid displaces a fluid material component of the mixture.

14. The method according to claim 1,
wherein
the mixture of materials flows through the channel as a result of gravitation.

15. The method according to claim 1, further comprising the step of also conveying the mixture of materials through the channel in the opposite direction to the gravitational force.

16. A device for separating materials for carrying out the method according to claim 1,
comprising at least a channel for guiding through a mixture of materials to be separated, the mixture consisting of solids and fluid components, which differ from each other in their physical properties, including their density and lift, and which are distributed in an approximately even fashion in a fluid flow of the mixture, the channel including at least one inlet portion and at least one outlet portion for conveying a wash liquid through the channel in a direction transverse to the direction of flow of the mixture of materials in order to displace from the channel a material component to be separated from the mixture of materials,
wherein
the inlet portion and the outlet portion are provided at a wall of the channel and
seen transversely to the longitudinal direction of the channel the inlet portion and the outlet portion lie opposite each other in a direct or offset manner at least in sections, and wherein
the inlet portion and/or the outlet portion include a plurality of guide members for guiding the flow of the wash liquid into and/or out of the channel in a direction transverse to the flow direction of the mixture of materials,
the guide members limit the channel at least partially,
the guide members are arranged at least approximately parallel at a distance to each other and
the guide members are arranged in an inclined fashion at a predetermined angle to the direction of flow of the mixture of materials.

17. The device according to claim 16,
wherein
the channel has a polygonal cross-sectional form at least in the inlet portion and/or in the outlet portion and
the guide members are strip-shaped.

18. The device according to claim 16,
wherein
at the inlet portion and/or at the outlet portion at least one fluid-permeable surface section is provided which is flowable through by the wash liquid.

19. The device according to claim 18,
wherein
the at least one fluid-permeable surface section is also flowable through by the material component to be separated.

20. The device according to claim 16,
wherein
a plurality of inlet portions and outlet portions is arranged at the channel, with each inlet portion having an outlet portion assigned thereto and seen in the longitudinal direction of the channel an inlet portion with the assigned outlet portion each follows an inlet portion with the assigned outlet portion, with the respective following inlet portion being provided at the channel wall lying opposite the previous inlet portion.

21. The device according to claim 20,
wherein
seen in the direction of flow of the mixture of materials the outlet portion arranged downstream is in flow connection with the inlet portion arranged opposite the latter directly upstream.

22. The device according to claim 16,
wherein
the predetermined angle corresponds to an angle of repose of a particulate material component of the mixture of materials, at which a deposition of the particulate material components on the guide members is prevented at least in an approximately complete manner.

23. The device according to claim 16,
wherein
the distance between the guide members and/or the predetermined angle of at least one of the guide members is variably adjustable.

24. The device according to claim 16,
wherein
the surface of the inlet portion that is flowed through by the wash liquid is smaller than the surface of the outlet portion that is flowed through by the wash liquid.

25. A device for separating materials for carrying out the method according to claim 1,
comprising at least a channel for guiding through a mixture of materials to be separated, which includes at least one inlet portion and at least one outlet portion for conveying a wash liquid through the channel in a direction transverse to the direction of flow of the mixture of materials in order to displace from the channel a material component to be separated from the mixture of materials,
wherein
the inlet portion and the outlet portion are provided at a wall of the channel and
seen transversely to the longitudinal direction of the channel the inlet portion and the outlet portion lie opposite each other in a direct or offset manner at least in sections, and wherein
the inlet portion and/or the outlet portion include a plurality of guide members for guiding the flow of the wash fluid into and/or out of the channel in a direction transverse to the flow direction of the mixture of materials,
the guide members limit the channel at least partially,
the guide members are arranged at least approximately parallel at a distance to each other and
the guide members are arranged in an inclined fashion at a predetermined angle to the direction of flow of the mixture of materials,
wherein
at the inlet portion and/or at the outlet portion at least one fluid-permeable surface section is provided which is flowable through by the wash fluid and
wherein the at least one fluid-permeable surface section is a filter medium.

26. A device for separating materials for carrying out the method according to claim 1,
comprising at least a channel for guiding through a mixture of materials to be separated, which includes at least one inlet portion and at least one outlet portion for conveying a wash liquid through the channel in a direction transverse to the direction of flow of the mixture of materials in order to displace from the channel a material component to be separated from the mixture of materials, wherein the inlet portion and the outlet portion are provided at a wall of the channel and seen transversely to the longitudinal direction of the channel the inlet portion and the outlet portion lie opposite each other in a direct or offset manner at least in sections, and wherein the inlet portion and/or the outlet portion include a plurality of guide members for guiding the flow of the wash fluid into and/or out of the channel in a direction transverse to the flow direction of the mixture of materials, the guide members limit the channel at least partially, the guide members are arranged at least approximately parallel at a distance to each other and the guide members are arranged in an inclined fashion at a predetermined angle to the direction of flow of the mixture of materials, wherein the channel has an oval or circular cross-sectional form at least in the inlet portion and/or in the outlet portion and the guide members are designed in a ring-shaped or ring segment-shaped fashion and arranged concentrically to the channel at least in sections.

27. A device for separating materials for carrying out the method according to claim 1, comprising at least a channel for guiding through a mixture of materials to be separated, which includes at least one inlet portion and at least one outlet portion for conveying a wash liquid through the channel in a direction transverse to the direction of flow of the mixture of materials in order to displace from the channel a material component to be separated from the mixture of materials, wherein the inlet portion and the outlet portion are provided at a wall of the channel and seen transversely to the longitudinal direction of the channel the inlet portion and the outlet portion lie opposite each other in a direct or offset manner at least in sections, and wherein the inlet portion and/or the outlet portion include a plurality of guide members for guiding the flow of the wash fluid into and/or out of the channel in a direction transverse to the flow direction of the mixture of materials, the guide members limit the channel at least partially, the guide members are arranged at least approximately parallel at a distance to each other and the guide members are arranged in an inclined fashion at a predetermined angle to the direction of flow of the mixture of materials, wherein seen in the longitudinal direction of the channel the guide members are curved.

* * * * *